United States Patent
Murrish

(10) Patent No.: US 7,809,531 B2
(45) Date of Patent: Oct. 5, 2010

(54) METHODS AND SYSTEMS FOR EXPLICIT REPRESENTATION OF COMPOSITE STRUCTURES

(75) Inventor: Richard E. Murrish, Wichita, KS (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 11/763,863

(22) Filed: Jun. 15, 2007

(65) Prior Publication Data

US 2008/0312764 A1    Dec. 18, 2008

(51) Int. Cl.
*G06F 17/50* (2006.01)
(52) U.S. Cl. .......................................................... 703/1
(58) Field of Classification Search ................ 703/1, 703/2; 700/98; 706/919
See application file for complete search history.

(56) References Cited

U.S. PATENT DOCUMENTS

| | | | |
|---|---|---|---|
| 4,849,913 A | 7/1989 | Ward et al. | |
| 5,038,291 A | 8/1991 | Wang et al. | |
| 5,636,338 A | 6/1997 | Moreton | |
| 5,984,511 A | 11/1999 | Vasey-Glandon et al. | |
| 6,220,743 B1 | 4/2001 | Campestre et al. | |
| 6,341,261 B1 | 1/2002 | Vasey-Glandon et al. | |
| 6,799,081 B1 | 9/2004 | Hale et al. | |
| 7,010,472 B1 | 3/2006 | Vasey-Glandon et al. | |
| 7,099,725 B2 | 8/2006 | Murrish et al. | |

OTHER PUBLICATIONS

Holla et al., V.D. Offset of Curves on Tessellated Surfaces, Sciencedirect, Computer-Aided Design, vol. 35, Iss. 12, Oct. 2003, pp. 1099-1108.*
International Search Report of PCT/US2008/066937; Sep. 16, 2008; 11 pages.
Prakash, B.G.; AUTOLAY—a GUI-Based Design and Development Software for Laminated Composite Components; Computers & Graphics; Feb. 1, 1999; pp. 95-110; vol. 23, No. 1; Elsevier Science Ltd.

* cited by examiner

*Primary Examiner*—Russell Frejd
(74) *Attorney, Agent, or Firm*—Armstrong Teasdale LLP

(57) ABSTRACT

A three dimensional Computer Aided Design (CAD) model of a composite part to include a plurality of plies is described. The model includes an explicit representation for each individual ply utilized to form the composite part, where each individual ply is created as one of a solid or tessellated volume. Each ply representation is in a proper spatial orientation with related component definitions.

24 Claims, 9 Drawing Sheets

METHODS AND SYSTEMS FOR EXPLICIT REPRESENTATION OF COMPOSITE STRUCTURES

BACKGROUND OF THE INVENTION

This invention relates generally to computer aided design of structures fabricated from a number of plies, the structures possibly including one or more of inserts, cores, and subsystems, and more specifically, to methods and systems for explicit representation of such composite structures.

Heretofore, the descriptions resulting from computer aided design (CAD) of composite structures have been limited to implicit ply representations. These implicit methods make it extremely difficult to visualize and/or interrogate the resulting definitions for design intent information, for example, piercing, stacking, material, ply thickness, ply volume, ply orientation, and a overall thickness without specialized software. The above is especially true when model based definition is used, as opposed to a more conventional drawing based approach. While progress has been made in the definition of solids parts, there has been virtually no movement in the area of composite definitions. Prior approaches have been limited by the potential file size issues and the relational complexity of composite parts, which are fabricated from multiple layers, or plies, and which may include one or more of inserts, cores, and subsystems that, together with the plies, form one or more essentially inseparable assemblies.

For example, in one model based definition method each ply of a structure is represented as a surface. While this representation format provides a major improvement over two dimensional drawings and three dimensional wireframe representations, it still leaves ply thickness and stacking information as implied information. Plies represented as solids or shell solids would have explicit thicknesses, but unless they are generated and stacked properly, special programming is still required to derive the complete description of design intent.

BRIEF DESCRIPTION OF THE INVENTION

In one aspect, three dimensional Computer Aided Design (CAD) model of a composite part to include a plurality of plies is provided. The model includes an explicit representation for each individual ply utilized to form the composite part where each individual ply is created as one of a solid format or a closed tessellated volume format. Each ply representation is located in proper spatial orientation with related component definitions.

In another aspect, a method for explicitly representing individual plies of a composite structure is provided. The method includes defining the individual plies of the structure, converting the individual ply definitions into a tessellated volume representation for each ply, utilizing the tessellated volume representations of the individual plies to generate a three dimensional design intent representation for the composite structure, and describing the individual plies in a format for re-purposing that is compatible with one or more computer-based viewer programs.

The features, functions, and advantages that have been discussed con be achieved independently in various embodiments of the present invention or may be combined in yet other embodiments further details of which can be seen with reference to the following description and drawings.

DETAILED DESCRIPTION OF THE INVENTION

Figure 1:
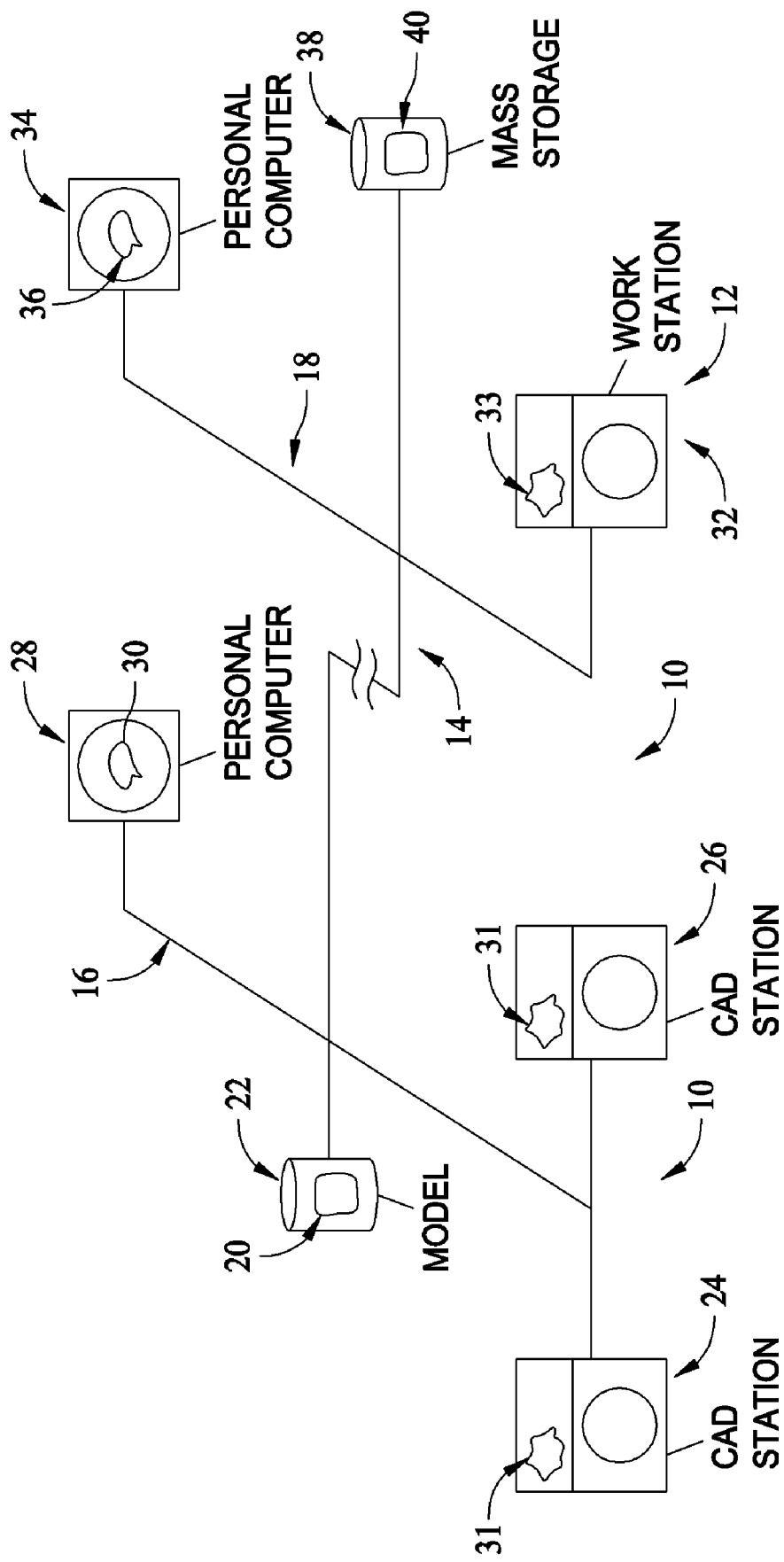
FIG. 1 is a schematic view of a computer network within which the herein described embodiments may be utilized.

The methods and systems described herein utilize an explicit representation of design intent when compared to prior approaches. Specifically, one method utilizes explicit representations of individual plies, created as solids, volumetric representations, or tessellated volumes that are in proper spatial orientation with any number of related part/component definitions to create an inseparable assembly construct. Advances in computing technology have made the use of these formats and representations possible and practical.

Previously, wire frame computer aided design (CAD) technology allowed modeling of only the boundary of the part being modeled. Without special software, wire frame models offered limited tools for designing, visualizing or otherwise interrogating the design intent of the composite part. With the inclusion of surface modeling, general tools could be generated to create component designs that were less implicit.

With truly explicit representations, design reviewers who are neither CAD proficient nor technical may fully participate in reviewing the design. Previously, their inability to visualize the part from the limited two-dimensional drawings or implicit three dimensional representations hampered them from forming opinions regarding the design. Thus, three-dimensional solid or tessellated volume representations of composite structures improve the usability and quality of a design and correspondingly reduces development costs. Three-dimensional CAD geometry, including surfaces, shells shell solids, or tessellated volumes can be termed collectively as CAD native geometric shapes.

Moreover, because composites offer great flexibility in shaping complex parts subject to demanding service environments, providing tools to completely model composite parts is highly desired. Likewise, because manufacturing of composite parts entails significant expenditures, improving the manufacturability of the design of composite parts is also desirable.

Accordingly, data structures are provided with which to model composite plies. The data structures may be used in conjunction with other modeling techniques in order to express the design intent. Since the embodiments described herein accomplish this without the use of proprietary data structures hidden from low-end viewers, manufacturing personnel at remote sites may also access designs modeled utilizing these embodiments.

In the way of background, a model is a mathematical representation of a part. The model may be of a single part, a component of the part, or even a higher-level assembly including multiple parts. Models are usually created with the aid of a CAD software package and are stored as computer files. Many different file formats are available. For instance, CATIA (available from IBM of White Plains, N.Y.) and Unigraphics (available from EDS of Plano, Tex.) represent a few of the many CAD packages available.

Design intent includes information important to the design but not necessarily embodied in the model. For instance, a design requirement for two surfaces to remain parallel would not necessarily be included in the design geometry. However, the fact that the two surfaces are parallel can be readily observed. If during the course of the design the length of one of the members connecting the two surfaces were to change, the surfaces might skew from being parallel. Thus, without the capture of this piece of design intent, errors in manufacturing may occur.

Also useful for an understanding of the described embodiments, the environment in which they may be used is described. For example, the embodiments may be utilized by remotely located members of a product development team as illustrated in FIG. 1. For instance, a prime contractor 10 at one location will contract with a specialty subcontractor 12 to aid in the development of the product. Between the prime contractor 10 and the subcontractor 12 a computer connection may be establish via the internet 14 or other computer network. The computer connection 14 allows devices on the prime contractor's intranet 16 to communicate with devices on the subcontractor's intranet 18.

At the prime contractor's location, an assembly model 20 may be stored on a mass storage device 22. Designers working on the model 20 on CAD stations 24 and 26 access the model via the intranet 16. Per the CAD application licensing agreement, the CAD terminals have licenses 31 to use the CAD application. In contrast, a personal computer 28 at the prime contractor's location may not have a license 23. Instead, the personal computer has a low-end viewer 30. On the personal computer 28 other development team members may view the model via the low-end viewer 30.

A similar system exists at the sub contractor's 12 location using work station 32 with license 33; personal computer 34 with low end viewer 36; mass storage device 38 storing model 40; and an intranet 18 to allow communication between these devices. The primary difference between the model 20 and the model 40 is that the model 20 is typically a higher-level assembly model, whereas the model 40 is a model of a detail part. Of course, the model 40 could be the assembly model and model 20 could be the detail model. Indeed, taken together the two models are an integrated model of the entire product. Also, either model may include models of composite parts. Regardless of the choice of which model is the assembly, a team member at any of the devices may obtain detailed design information regarding the models 20 and 40.

Figure 2:
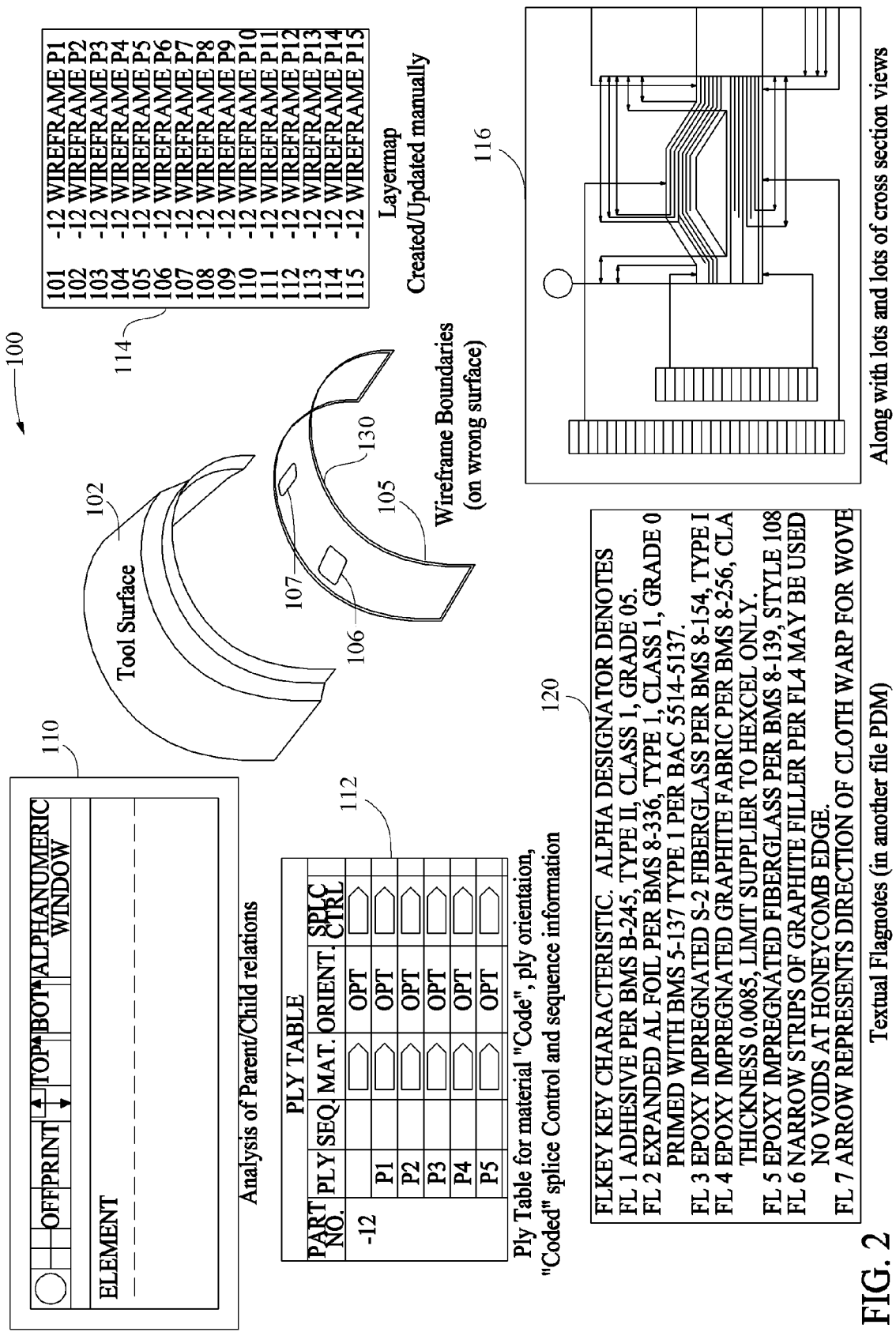
FIG. 2 is an illustration of drawings and data table associated with drawing based composite representations.

FIG. 2 is a composite illustration of representations, drawings, and data tables associated with a drawing based composite component 100. The illustrated component 100 is shown as having a related definition surface 102, also referred to as a tool surface. A wireframe drawing of a singly ply 104, or composite layer, of component 100 is also illustrated, and includes three pieces of material, a perimeter piece 105 and island plies 106 and 107. The three pieces, a perimeter piece 105, and island plies 106 and 107, represent a single layer in the fabrication of component 100. Specifically, component 100 is built up layer by layer until the component is built up as illustrated in the cross-sectional view 116. The problems with such a representation of a component include the multiple amounts of interrelated support data needed to describe the component. Referring to FIG. 2, to accurately describe component 100, an analysis 110 of parent/child relations, a ply table 112 for material codes and ply orientation, a layer map 114, multiple cross-sectional views 116, and flag notes 120 are utilized. The flag notes 120 are utilized to point to other documents to provide definition for the illustrated part, in this instance component 100. An example would be a reference to the specification for a layer of composite material, where the specification provides for the user a thickness associated with a specific layer of the composite material.

However, and again referring to component 100, from a visualization standpoint, it is difficult to determine an inside of component 100 from the outside, and how many plies are utilized in the fabrication of the component. Referring to the wireframe components of perimeter piece 105, and island plies 106 and 107, perimeter piece 105 may also be referred to as an edge band ply 130 that extends all the way around the outside, or perimeter, and two island plies 106 and 107 located substantially near a center of component 100. However, other than for the boundary ply 130 and island plies 106 and 107, there is no indication of the makeup of the other plies of the component 102. To get that type of information, the ply table 112 has to be accessed. For example, a ply table may indicate that ply seven is fabricated from material "x", and ply nine is fabricated from material "y". Another of the documents (i.e., the cross-sectional views 116) is utilized to manually determine a thickness of the overall assembly, not of the individual plies. It is important to emphasize that the wireframe components of boundary ply 130 and island plies 106 and 107 is but one layer of the multiple layers utilized in the fabrication of component 102, and the island plies 106 and 107 may describe, for example, honeycomb inserts in between plies as might be inferred from the cross-sectional view. However, each laminate (e.g., a collection of plies without other structure inserted between them) may form separate parts of an assembly level construct containing other inserts or sub-systems making up the overall composite design.

Summarizing FIG. 2, boundary ply 130 and island plies 106 and 107 represent one layer of the multiple layer component 102. The one layer illustrated includes three pieces of material and is one part of a component built up layer by layer until the component is built up as illustrated in the cross-sectional view 116. It should be noted that many composite parts include hundreds or thousands of such layers.

Figure 3:
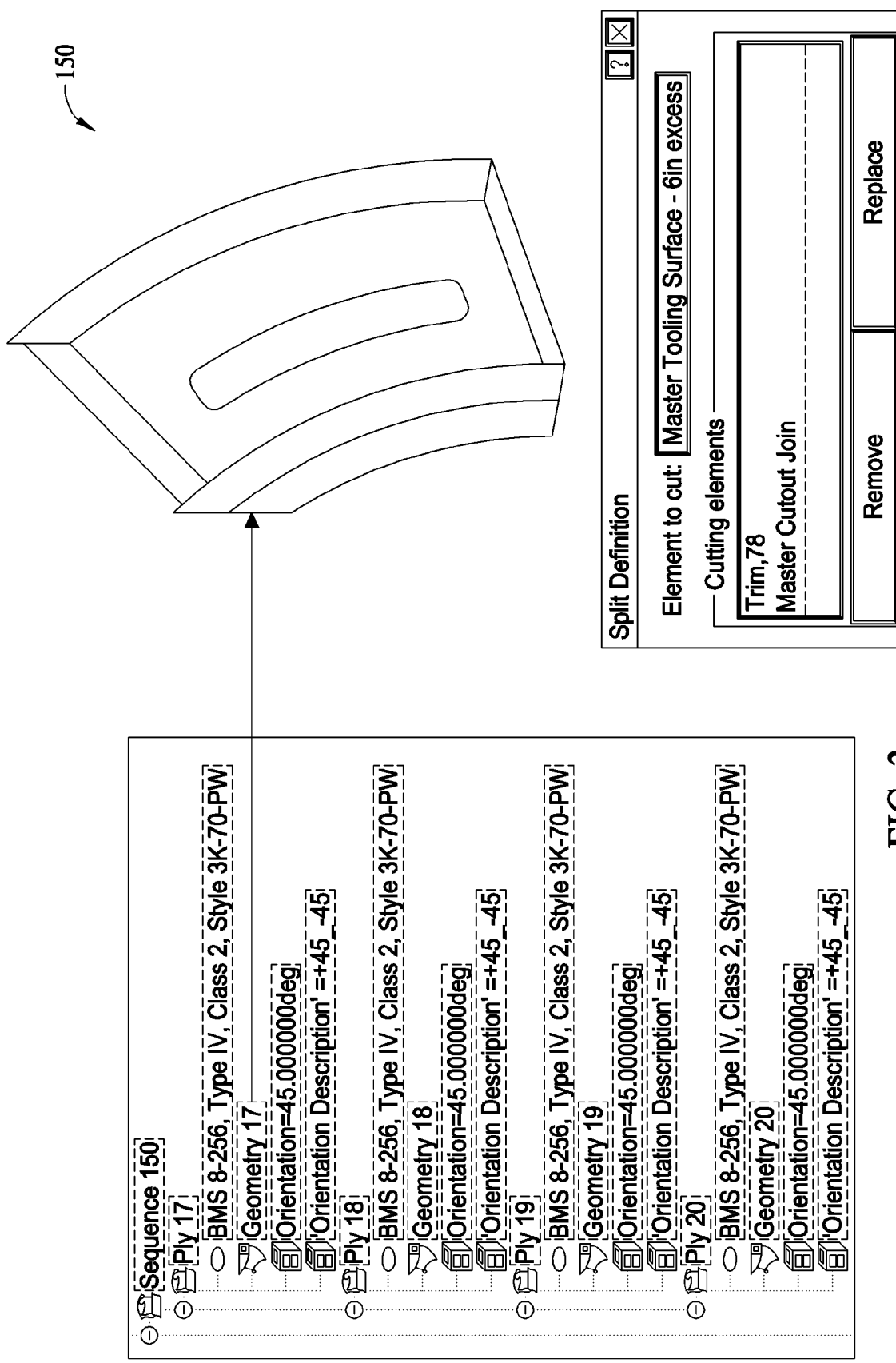
FIG. 3 is an illustration of a traditional model based definition ply format including a descriptive definition for each ply.

FIG. 3 is an illustration of a ply 150 displayed in a model based definition ply format. The ply format includes a descriptive definition for each piece of composite material, or ply, in a sequence, however, the descriptive definition for each ply is not considered a completely explicit representation of each ply. Specifically, no thickness is explicitly available. In FIG. 3, surfaces of ply 150 are illustrated and the component is illustrated utilizing its surfaces. In the illustration, plies 17-20 are in sequence 150, that is, they are placed substantially simultaneously, are likely the same material, and likely do not overlap one another. A plurality of sequences, similar to sequence 150, defines the composite part being fabricated, with each sequence having one or more plies associated there-with. However, the stacking of sequences is implied through the naming (sequence 150 and plies 17-20) and associated tree structure. Therefore, the information associated with FIG. 3 is not sufficient to allow visualization for each individual layer of the composite material. A further goal is to allow the visualization of such individual layers through utilization of a relatively low end viewer, so that all users that review such representations are required to have access to a fully functional computer aided design program, which can be relatively expensive.

Figure 4:
FIG. 4 is an explicit representation of a single ply, including data parameters associated with the single ply.
Figure 5:
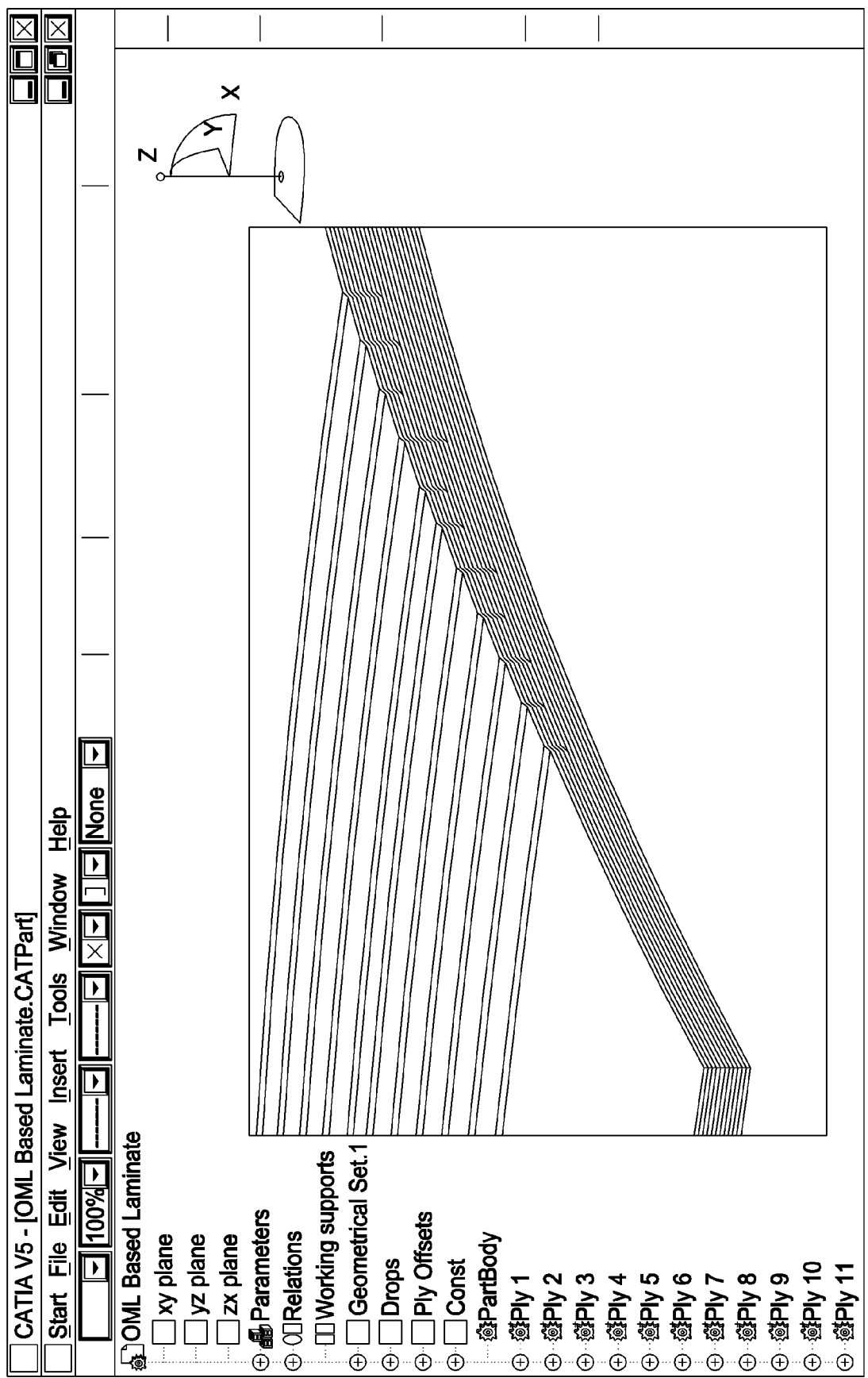
FIG. 5 is a representation of a component fabricated from multiple plies where an explicit representation is available for each ply.

FIG. 4 is an explicit, three dimensional representation of a single ply 250, including data parameters associated with the single ply. With ply 250, the representation indicates whether the ply 250 is configured with holes and also provides an indication of a volume associated with the ply 250. The embodiment is explicitly geometrically bounded, including an exploded view of one corner of the ply 250 to illustrate an explicit ply thickness. Further, ply 250 has attached to it an orientation for the ply 250 and a material from which the ply 250 is fabricated.

Where FIG. 4 is a solid representation of a single ply, FIG. 5 illustrates a multiple ply structure 300 where every ply in the structure (19 plies in the illustrated embodiment) can be selected and displayed as a solid. FIG. 5 illustrates that not only is every ply of the component illustrated, but as they are stacked upon one another, they are stacked quasi realistically, for example, on top of each other with approximated ramps where plies drop off from the stack. For a comparative reference, in current representations, all of these plies are represented as a surface at the lowest level. Therefore, all of the individual plies would be represented as stacking right on top of each other. That is, all the plies of a component would take up the same space, which is not a realistic, real world, representation.

FIG. 5 also includes a pull down menu where a user is able to select one of the 19 plies for explicit viewing. Upon selection of one of the plies, it is displayed as a volumetric representation and the user is able to see all its variations, for example, if there are any holes or other discontinuities associated with the displayed ply. Each ply is represented by a explicit geometric entity, which includes data providing a true volumetric representation of a ply in its correct stacking sequence with respect to the other plies of a component. A ply typically can be made heavier or lighter, a change in the thickness of the material, for example, to control stiffness and strength. Additionally, if a ply is removed from the structure, the representations for the other plies that are above it in the stack are all changed, which brings the benefits of computer aided design to layered composites, at a single layer level.

What is of interest to most users, and provided in the described embodiments, is the ability to see where the stacks of plies are, see how plies relate to one another, and be able to cross-section the resulting component at any place, at any time, without the use of a specific composite tool. This is sometimes referred to as a quasi-realistic stack up. Therefore, and in one embodiment, an explicit representation for an individual ply includes an attribute that indicates a location of the ply with respect to at least one other ply, a geometric representation of the ply, the materials orientation with respect to a theoretical coordinate system and the specification for the material the ply is made from.

Figure 6:
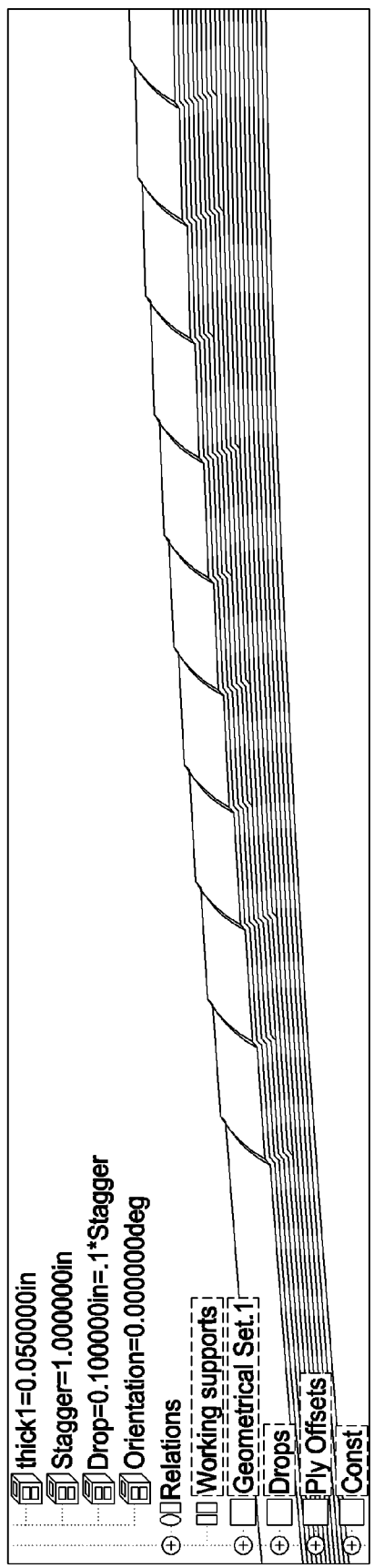
FIG. 6 is a cross-sectional view of a first object, each ply of the object including an explicit representation.
Figure 7:
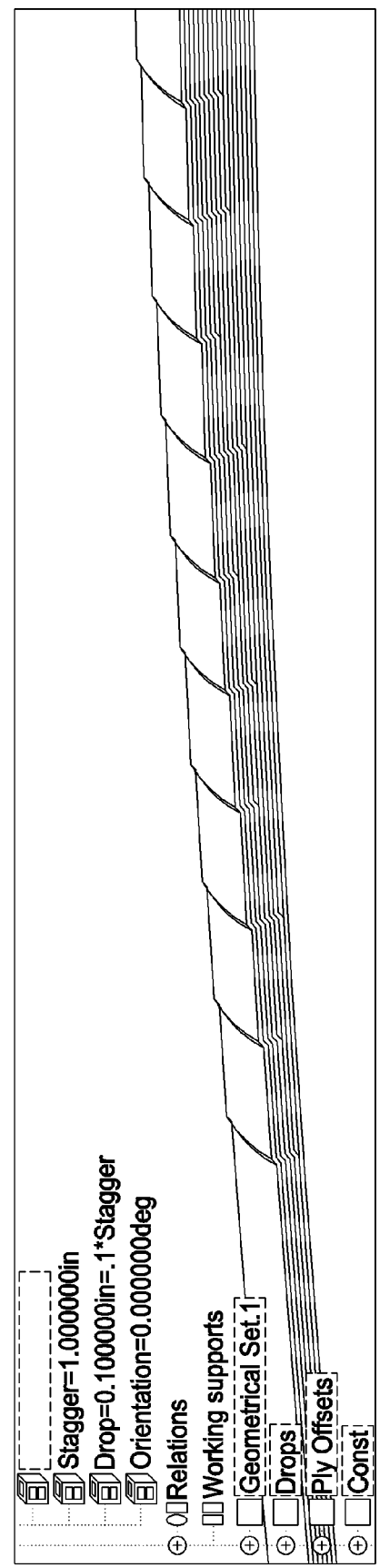
FIG. 7 is a cross-sectional view of a second object, each ply of the object including an explicit representation.
Figure 8:
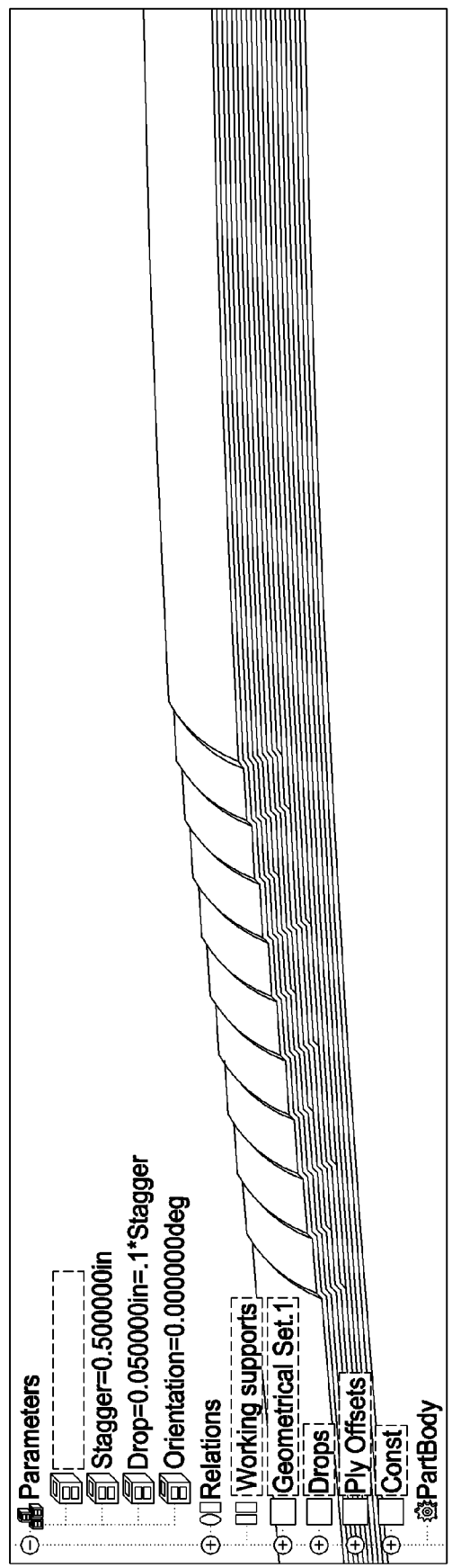
FIG. 8 is a cross-sectional view of a third object, each ply of the object including an explicit representation.

FIGS. 6, 7, and 8 are various cross-sectional views of a component where each ply of the component includes an explicit representation for that ply. In the example of FIG. 6, the plies are each 0.05 inches thick and have a stagger of 1.0 inch. In FIG. 7, the thickness of each ply is 0.025 inch. Therefore for the same number of plies, the component is one-half the thickness of the component of FIG. 6. Finally, FIG. 8 includes plies with a thickness of 0.05 inch and a stagger of 0.5 inch. The differences in the staggering between the individual components (plies) of FIGS. 6 and 8 are illustrated by the variances in the taper of the components as illustrated. Design intent differences in the configurations are clearly visible and easily distinguishable.

FIGS. 6, 7, and 8 illustrate a gradual reduction in the overall thickness of the composite assembly from 19 plies to 10 plies in what would typically be called a ply drop off area or ramp. By varying one or more of the stagger and material thickness parameters to explicitly represent variation in either placement of individual plies and a thickness in the materials used for each ply, the design intent is clearly changed and illustrated.

FIGS. 6, 7, and 8 not only illustrate every ply of the solid component build up structure, but as the plies are stacked, they are stacked quasi-realistically. In an embodiment, where an individual ply ends, the drop off in the composite structure stack is idealized as a straight line drop, as accuracy of one layer's dimensions to that of other layers, in those areas, is typically not critical in the representation of multiple layer composite structures. This is a vast improvement over current representations where every ply is described at its lowest level, whereas in the herein described representations all of the plies are stacked right on top of one another. In other words all of the plies in a laminate of the current representation methods take up the same space. FIGS. 6, 7, and 8 illustrate the handling of complex relational design with respect to the stacking of individual plies. Further, by representing each ply individually, a user is able to visualize the impact, for example, of eliminating certain plies and compare that impact to the desired configuration for the completed assembly.

Figure 9:
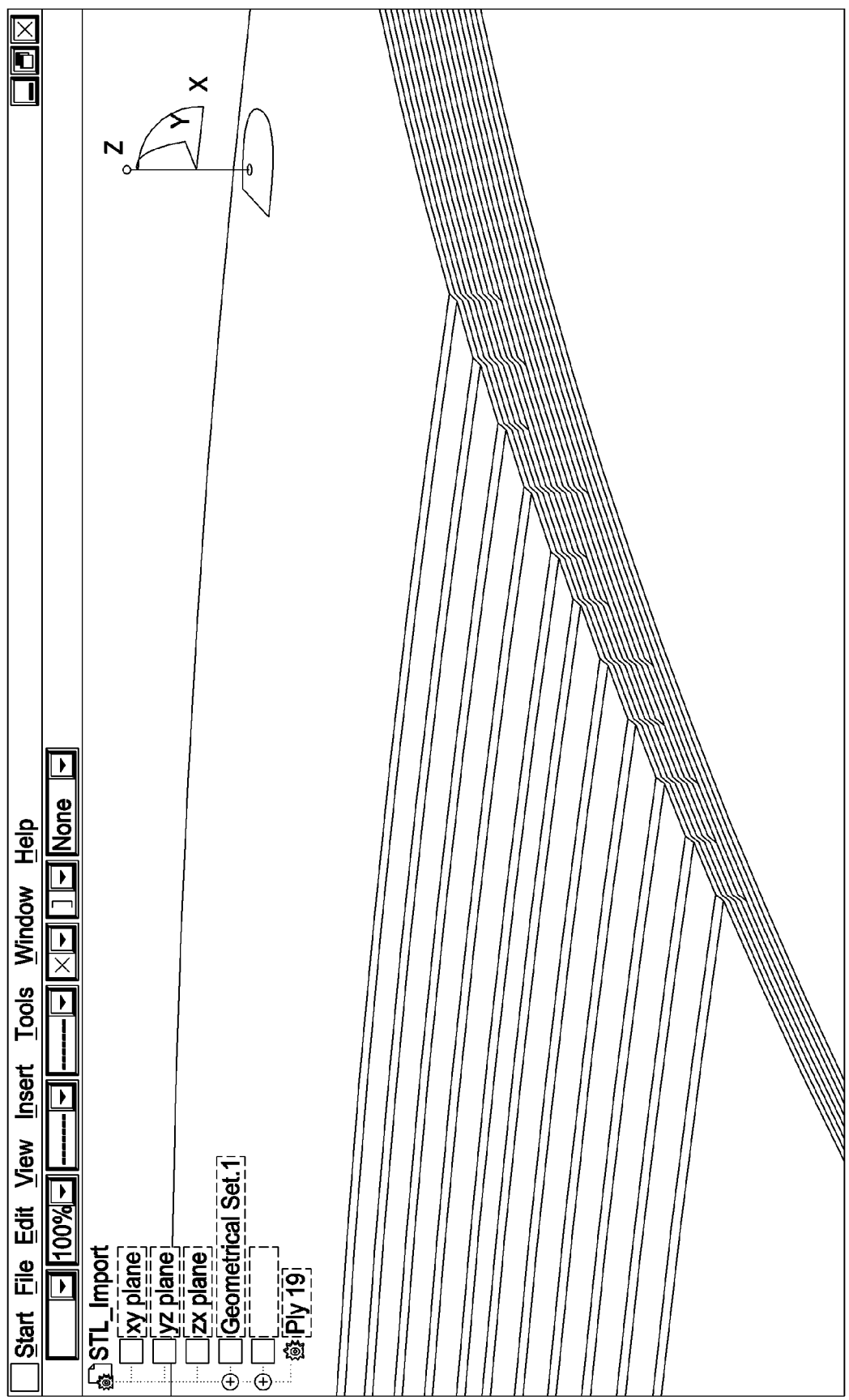
FIG. 9 is a tessellated volume view of a single ply of a multiple ply component.

FIG. 9 is a tessellated volume view of a single ply of a multiple ply component. Other plies are illustrated as being underneath the ply illustrated as the tessellated volume. The tessellated volume view illustrates a ply of a component as a number of flat triangles (sometimes called facets) adjacent one another, each illustrating a planar approximation of a small portion of the exact three dimensional object. Such a representation provides an acceptable definition of the surfaces related to the ply, provides a design intent, while also allowing for a definition of the individual layers that can be repurposed, for example, defined in a format that can be utilized by a user using a lower end viewer, for example, a portable data format (e.g., a pdf file) viewer.

A tessellated volume view provides the building blocks of an element mesh or a mesh representation. Such representations provide a user with a three dimensional volumetric representation (top, bottom, and sides) from which a thickness of the component at a particular point may be measured. More particularly, the user is able to calculate a volume, for example, how big a component is in terms of cubic inches which can be combined with the material properties for the particular ply. Therefore, the computer is also able to calculate a weight for the component since the computer is configured with data relating to various materials, for example, weights and densities of the various materials that are useful as a ply of a composite component.

In one embodiment, the above described tessellated volumes can be converted into a stereo lithography format, which includes, for example, an x, y, z position of each point of a triangle with respect to a reference and defines how the triangles are interconnected to one another. The stereo lithography format is easily re-purposed, and as such, a user is able to access the computer aided design data, for each individual layer of a composite structure (e.g., a representation of each individual ply), with an easily attainable computer-based, low end, viewer program, an example of which is the Adobe pdf viewer (Adobe is a registered trademark of Adobe Systems Incorporated of San Jose, Calif.).

Figure 10:
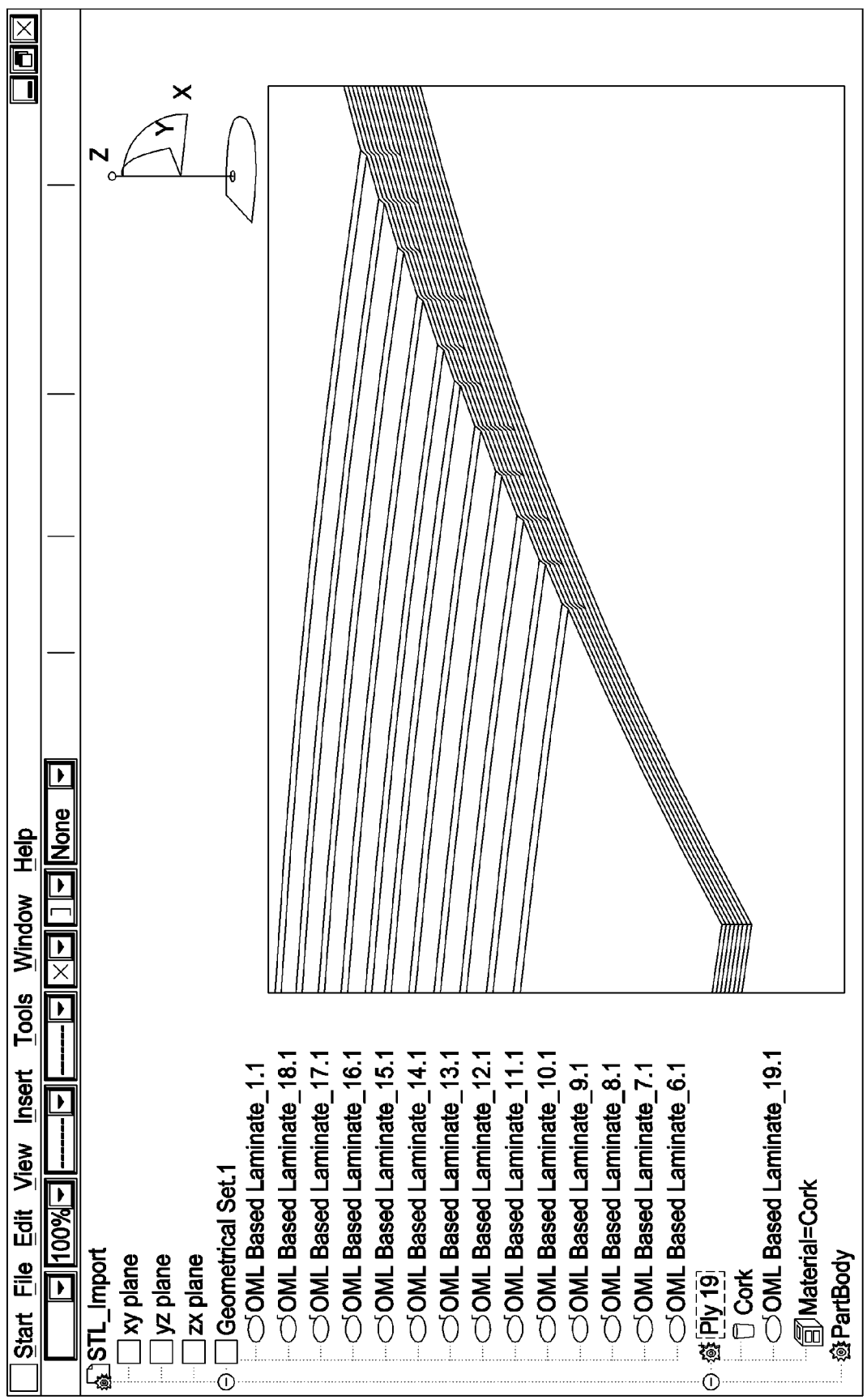
FIG. 10 is a tessellated volume view of a single ply of a component fabricated using multiple plies, that includes explicit data relating to the single ply.

FIG. 10 illustrates that individual plies of a component may be selected by a user and viewed as a tessellated volume, including display of the material used and other explicit data relating to the displayed ply such as the orientation of the fibers in the ply relative to the theoretical norms. In one embodiment, the representation of the individual plies includes data formatted in stereo lithography data or cloud of points formats. However, any facetted representation can be utilized as long as the resulting volume is totally enclosed. The size of the facets need to be controlled in such a manner as to maintain the relative accuracy required for composite design.

The above described methods and systems are at least in part made practical due to a transition of computing technology from 32-bit to 64-bit addressing and from single processor to multiple processor configurations. These increases in computing capability and memory allow a CAD system to support spatially correct, three dimensional, volumetric representations (solid or tessellated) of plies to set forth a sufficient design intent in which users are working at a correct level of fidelity for optimal results. This concept is sometimes referred to herein as providing downstream users with sufficient design intent.

While the invention has been described in terms of various specific embodiments, those skilled in the art will recognize that the invention can be practiced with modification within the spirit and scope of the claims.

What is claimed is:

1. A computer readable medium with computer instructions embedded thereon, which, when executed, generate a three dimensional Computer Aided Design (CAD) model of a composite part to include a plurality of plies, the model including an explicit representation for each individual ply utilized to form the composite part, each individual ply created as one of a solid format or a closed tessellated volume format, each said representation located in proper spatial orientation with related component definitions.

2. The computer readable medium according to claim 1 wherein said explicit representation of the individual plies includes instructions configured to create an inseparable assembly construct.

3. The computer readable medium according to claim 1 wherein for a closed tessellated volume format representation of an individual ply, each tessellation or facet is a planar approximation of a ply's surface having a fidelity sufficient to retain a design intent.

4. The computer readable medium according to claim 1 wherein said explicit representation of the individual plies comprises an attribute that indicates an orientation of an individual ply with respect to theoretical directions represented in the composite design.

5. The computer readable medium according to claim 1 wherein said explicit representation of the individual plies includes data in a closed faceted volume of sufficient fidelity to convey design intent.

6. The computer readable medium according to claim 1 wherein said model further comprises at least one of inserts, cores, and subsystems included with said plies.

7. The computer readable medium according to claim 1 wherein said model is presented in a defined format that can be converted into a format that provides a closed tessellated volumetric representation.

8. A method for explicitly representing individual plies of a composite structure, said method comprising:
defining the individual plies of the structure;
creating the individual ply definitions in a tessellated volume representation for each ply;
utilizing the tessellated volume representations for the individual plies to generate a three dimensional design intent representation for the composite structure;
describing the tessellated volumes in a format compatible with re-purposing to one or more computer-based viewer programs.

9. A method according to claim 8 wherein the tessellated volume representation comprises a position of each triangle of the tessellated volume with respect to a reference and a definition of how the triangles are interconnected.

10. A method according to claim 8 wherein describing the tessellated volumes in a format comprises converting the tessellated volumes into a defined format that provides a closed tessellated volumetric representation.

11. A method according to claim 8 wherein defining the individual plies of the structure comprises displaying every ply in the structure as a solid.

12. A method according to claim 8 wherein defining the individual plies of the structure comprises displaying the plies in a quasi-realistic stacking sequence with respect to one another.

13. A method according to claim 8 further comprising representing any holes or other discontinuities associated with ply definition.

14. A method according to claim 8 wherein describing the tessellated volumes in a format comprises at least one of providing an ability to see where the stacks of plies are, providing an ability to display how the plies relate to one another, providing an ability to cross-section the resulting component at any place, at any time, without the use of a specific composite tool.

15. A method according to claim 8 wherein defining the individual plies of the structure comprises including an attribute that indicates a location of the ply with respect to at least one other ply, defining a geometry of the ply, a material used to make the ply and indicating a materials orientation with respect to a theoretical coordinate system.

16. A method according to claim 8 wherein defining the individual plies of the structure comprises conveying design intent for the structure.

17. A method according to claim 8 wherein utilizing the tessellated volume representations of the individual plies to generate a three dimensional design intent representation comprises stacking the tessellated volume representations of the individual plies to generate an overall representation of the laminate composite structure.

18. A method according to claim 8 wherein utilizing the tessellated volume representations of the individual plies to generate a three dimensional design intent representation for the structure further comprises providing a capability to determine a thickness of the composite structure at any particular point of the structure.

19. A method according to claim 8 wherein utilizing the tessellated volume representations of the individual plies to generate a three dimensional design intent representation for the structure further comprises providing a capability to calculate a volume for an individual ply utilizing material properties associated with the particular ply.

20. A method according to claim 19 further comprising calculating a weight for, the composite structure utilizing the material properties and volumes associated with the individual plies.

21. A system comprising:
- a first computer configured with a computer aided design program operable to generate one or more computer files that explicitly represent individual plies of a composite structure in a format compatible with re-purposing to one or more computer-based viewer programs; and
- a storage device configured for storage of the one or more computer files.

22. A system according to claim 21 wherein said storage device is communicatively coupled to said first computer via a computer network, said system further comprising a second computer communicatively coupled to said storage device via the computer network, said second computer configured with a viewer program operable for viewing the representations of the individual plies by accessing the one or more computer files.

23. A system according to claim 21 wherein to explicitly represent individual plies of a composite structure, said first computer is programmed to create each individual ply definition as one of a solid format or a closed tessellated volume format, each individual ply definition located in proper spatial orientation with related component definitions.

24. A system according to claim 21 wherein to explicitly represent individual plies of a composite structure, said first computer is programmed to:
- create the individual ply definitions in a tessellated volume representation for each ply; and
- utilizing the tessellated volume representations for the individual plies to generate a three dimensional design intent representation for the composite structure, the tessellated volume representations in a format compatible with the viewer program.

* * * * *